United States Patent Office 3,525,588
Patented Aug. 25, 1970

3,525,588
PREPARATION OF MAGNESIUM HYDROXIDE OF LOW SULFATE CONTENT
Paul Y. P. Hwang, Palo Alto, Calif., assignor to Merck & Co., Inc., Rahway, N.J., a corporation of New Jersey
No Drawing. Continuation-in-part of application Ser. No. 534,438, Mar. 15, 1966. This application July 19, 1968, Ser. No. 746,009
Int. Cl. C01f 5/14; A61k 27/00
U.S. Cl. 23—201       6 Claims

ABSTRACT OF THE DISCLOSURE

A process for producing magnesium hydroxide of reduced sulfate content comprising the treatment of a magnesium hydroxide slurry with ammonium hydroxide or an alkali metal hydroxide or hydride.

---

This application is a continuation in part of application Ser. No. 534,438, filed Mar. 15, 1966, now abandoned.

This invention is concerned with a method for preparing magnesium hydroxide of low sulfate content. More particularly, it is concerned with the process for preparing solid magnesium hydroxide having less than about .25 weight percent sulfate. Still more particularly, this invention concerns a process in which ammonium hydroxide, an alkali metal hydroxide or alkali metal hydride is useful in reducing the sulfate content of magnesium hydroxide.

Magnesium hydroxide is commonly used as an antacid. It is often used for this purpose in admixture with aluminum hydroxide. Naturally, the purity of magnesium hydroxide is an important factor when antacid use and human consumption are intended. In order to meet specifications regarding impurity in magnesium hydroxide, it is found necessary on occasion to lower the sulfate content of this material to an acceptable level. According to the present invention, it has now been found that the percentage of sulfate in magnesium hydroxide may be reduced to a level low enough to pass even the most rigid specifications by treating a magnesium hydroxide slurry with ammonium hydroxide, an alkali metal hydroxide or hydride before filtration.

In the past, several filtration and washing steps have proven necessary in order to adequately lower the amount of sulfate impurity in magnesium hydroxide solids to meet rigid specifications. An alternative known process for lowering the quantity of sulfate necessitates very low filter feed concentration and thereby renders large output difficult. A further known method useful in reducing the quantity of sulfate is a burdensome and expensive process utilizing carbonation, calcination, and rehydration steps.

It is an object of this invention to provide a method for preparing relatively pure magnesium hydroxide. It is a further object of this invention to prepare magnesium hydroxide having less than about .25 percent sulfate content from material having substantially higher amounts of the impurity. Another object is provision of a practical and economical method for lowering the sulfate content of dry magnesium hydroxide to a level which meets strict purity requirements. Another object is provision of a simple inexpensive method for reducing the sulfate content of magnesium hydroxide which eliminates carbonation, calcination, rehydration and additional filtration steps. Further objects will be apparent from the following description of the invention.

According to the present invention, a magnesium hydroxide slurry having in excess of .25 weight percent of sulfate (as $SO_4$) based on the quantity of magnesium hydroxide present is treated with an alkali metal base before filtration. Ammonium hydroxide, alkali metal hydroxides such as sodium hydroxide, lithium hydroxide, rubidium hydroxide and potassium hydroxide and their corresponding hydrides are useful in this regard. The process is carried out by adding the ammonium hydroxide or alkali metal base to a slurry containing the magnesium hydroxide to be purified, and filtering the resulting mixture in conventional fashion.

The quantity of additive based on the weight of magnesium hydroxide may vary from about 0.5% to about 20% by weight but amounts in the range of 2–10% are preferred. It is desired, but not essential, that this slurry be thoroughly admixed before filtration, thereby permitting improved contact between the various chemical components in the aqueous slurry. The temperature at which the process is carried out is not critical but practicality suggests that a temperature in the range of 100–200° F. be employed.

There is no desire to be bound by theoretical considerations as to the reasons for the result achieved by this invention. However, it is believed that the sulfate content of the final product is reduced by minimizing the amount of sulfate to be absorbed or occluded in the magnesium hydroxide particle.

The concentration of solids in the slurry is not critical to the success of the process but lowered concentrations tend to facilitate the sulfate removal operation. Slurry concentrations containing from about 2% to about 10% magnesium hydroxide are most conveniently employed. The concentration of magnesium hydroxide in the slurry is not significantly affected by the process of this invention and little, if any, loss of magnesium hydroxide occurs. Nor is the alkalinity or alkali metal content of the final product significantly affected by addition of the alkali metal base or ammonium hydroxide.

It has also been found in accordance with this invention that addition of ammonium hydroxide, alkali metal hydroxide or hydride to the magnesium hydroxide slurry eases filtration and improves the filtration rate. This is particularly so when the quantity of additive utilized is 5% or less based on the magnesium hydroxide present.

The following examples are given for the purpose of illustration and not by way of limitation.

EXAMPLE 1

About 2 liters of magnesium hydroxide slurry is treated with sodium hydroxide, mixed for ½ hour and heated to 160° F. ± 10°. The hot slurry is filtered on a leaf filter having a filter area of 0.1 sq. ft. The filter is covered with cotton duck cloth. A vacuum of about 22 in. of mercury is maintained throughout the filtration. The filter is immersed in the slurry for one minute thereby forming a magnesium hydroxide cake. This cake is then washed by immersing the filter into deionized water at room temperature for about one minute. The filter cake is then dried under vacuum for about ½ minute. The following results are obtained.

TABLE I

| $Mg(OH)_2$ percent conc. in slurry | Percent NaOH added, $Mg(OH)_2$ basis | Percent sulfate (as $SO_4$) $Mg(OH)_2$ Basis | | Filt'n rate, lb. $mg.(OH)_2$/ ft.²/cycle |
|---|---|---|---|---|
| | | Before filt'n | After filt'n | |
| 7.8 | 0 | 0.88 | 0.46 | 0.23 |
| 7.8 | 2.5 | 0.88 | 0.25 | 0.27 |
| 7.8 | 5.0 | 0.88 | 0.19 | 0.30 |
| 4.0 | 5.0 | 0.88 | 0.14 | 0.15 |

When ammonium hydroxide, potassium hydroxide, potassium hydride or sodium hydride is used in place of sodium hydroxide in the above procedure, similar results are obtained.

It should be noted that the addition of sodium hydroxide to the slurry substantially lowers the amount of sulfate present in the filtered magnesium hydroxide. Filtration rates improve by the addition of sodium hydroxide.

EXAMPLE 2

A slurry containing about 8.3% magnesium hydroxide (7 liters) and .55% sulfate on a magnesium hydroxide basis is treated with varying quantities of sodium hydroxide and heated to 160° F. ± 10° for about 2 hours. The slurry is then filtered on a leaf filter covered with cotton duck cloth. The filter has a filter area of 0.1 sq. ft. A vacuum of 22 in. of mercury is maintained throughout the experiment. The filter is immersed in the slurry for one minute and the filter cake formed is washed with deionized water at room temperature for about ½ minute. The filter cake is then dried under vacuum for about ½ minute. The following results are obtained.

TABLE II

| Percent NaOH added Mg(OH)$_2$ Basis: | Percent sulfate (as SO$_4$) after filtration Mg(OH)$_2$ basis |
|---|---|
| 0 | 0.4 |
| 5 | 0.21 |
| 10 | 0.19 |

When ammonium hydroxide, potassium hydroxide, potassium hydride or sodium hydride is used in place of sodium hydroxide in the above procedure, similar results are obtained.

The results shown in Table II illustrate clearly that upon the addition of sodium hydroxide the amount of sulfate in the filtered magnesium hydroxide decreases, such decrease becoming greater with increased sodium hydroxide addition.

It should be understood that although this invention has been described with reference to particular embodiments thereof, changes and modifications may be made which are within its intended scope and it should be limited only by the language of the appended claims.

What is claimed is:

1. The process for preparing magnesium hydroxide having less than about .25 weight percent sulfate content which comprises treating a magnesium hydroxide slurry wherein the magnesium hydroxide contains greater than .25 weight percent sulfate content with 0.5–20% based upon the weight of magnesium hydroxide of an alkali metal compound or an ammonium compound selected from the group consisting of an alkali metal hydroxide, an alkali metal hydride, and ammonium hydroxide, heating the mixture from about 100–200° F., and recovering the magnesium hydroxide from the mother liquor by filtration.

2. A process according to claim 1 wherein the alkali metal compound is sodium hydroxide.

3. A process according to claim 2 wherein 2–10% of sodium hydroxide is added to the magnesium hydroxide slurry.

4. A process according to claim 1 wherein the alkali metal compound is sodium hydride, potassium hydride or potassium hydroxide.

5. A process according to claim 4 wherein 2–10% of alkali metal compound is added to the magnesium hydroxide slurry.

6. A process according to claim 1 wherein ammonium hydroxide is employed.

References Cited

UNITED STATES PATENTS 3,127,241  3/1964  Periard et al. _____ 23—201

FOREIGN PATENTS 3,713,453  10/1962  Japan.

OTHER REFERENCES

Mellor: Comprehensive Treatise on Inorganic and Theoretical Chemistry, vol. 2 (1922), p. 483, QD 31M4.

OSCAR R. VERTIZ, Primary Examiner

H. S. MILLER, Assistant Examiner

U.S. Cl. X.R.

424—157